(12) United States Patent
Kim et al.

(10) Patent No.: US 12,415,452 B2
(45) Date of Patent: Sep. 16, 2025

(54) CUP HOLDER FOR VEHICLE

(71) Applicant: HYUNDAI IND. CO., LTD., Ulsan (KR)

(72) Inventors: Min Soo Kim, Ulsan (KR); Woo Jung Jang, Ulsan (KR)

(73) Assignee: HYUNDAI IND. CO., LTD., Ulsan (KR)

( * ) Notice: Subject to any disclaimer, the term of this patent is extended or adjusted under 35 U.S.C. 154(b) by 0 days.

(21) Appl. No.: 18/639,842

(22) Filed: Apr. 18, 2024

(65) Prior Publication Data
US 2024/0351499 A1   Oct. 24, 2024

(30) Foreign Application Priority Data

Apr. 21, 2023   (KR) .................. 10-2023-0052689

(51) Int. Cl.
*B60N 3/10*   (2006.01)
(52) U.S. Cl.
CPC .................... *B60N 3/106* (2013.01)
(58) Field of Classification Search
CPC ...................................... B60N 3/106
USPC ...................................... 248/311.2
See application file for complete search history.

(56) References Cited

U.S. PATENT DOCUMENTS

| | | | | |
|---|---|---|---|---|
| 5,673,891 A * | 10/1997 | Fujihara | .................. | B60N 3/106 297/188.17 |
| 6,685,152 B2 * | 2/2004 | Shirase | .................. | B60N 3/102 248/312.1 |
| 6,837,471 B2 * | 1/2005 | Izume | ................ | B64D 11/0638 248/311.2 |
| 6,854,699 B2 * | 2/2005 | Nishizawa | ............. | B60N 3/106 248/27.1 |
| 7,121,517 B2 * | 10/2006 | Oana | ...................... | B60N 3/102 224/281 |

FOREIGN PATENT DOCUMENTS

| | | |
|---|---|---|
| JP | 10-236210 A | 9/1998 |
| JP | 2000-62514 A | 2/2000 |
| JP | 6895655 B2 | 6/2021 |
| KR | 10 2006-0109322 A | 10/2006 |

(Continued)

*Primary Examiner* — Anita M King
(74) *Attorney, Agent, or Firm* — NSIP Law

(57) ABSTRACT

The present invention relates to a cup holder for an automobile, which is installed in the interior of a vehicle for holding a beverage cup or a beverage can, and includes a capturing part accommodated in a case (10) through a front cover (13) of a cup holder or advancing forward, and a support plate (31) connected to the capturing part (21) via a first link plate (51) and a second link plate (54), wherein in a use state that the capturing part (21) advances forward from the case (10), when a user puts a beverage cup on the support plate (31) in an exposed state or moves the support plate (31) slightly downward, the support plate (31) quickly moves downward and then maintains the moved state, and on the contrary, when the user rotates the support plate (31) and the capturing part (21) on the plane to store the support plate (31) and the capturing part (21) into the case (10) or moves the support plate (31) slightly upward, the support plate (31) quickly moves upward and is folded to be easily stored in the case (10) together with the capturing part (21).

2 Claims, 8 Drawing Sheets

(56) References Cited

FOREIGN PATENT DOCUMENTS

| | | |
|---|---|---|
| KR | 10-0916710 B1 | 9/2009 |
| KR | 10-1695142 B1 | 1/2017 |
| KR | 10-2218171 B1 | 2/2021 |

\* cited by examiner

CUP HOLDER FOR VEHICLE

CROSS-REFERENCE TO RELATED APPLICATIONS

This application claims the benefit under 35 USC § 119 (a) of Korean Patent Application No. 10-2023-0052689, filed on Apr. 21, 2023, in the Korean Intellectual Property Office, the entire disclosure of which is incorporated herein by reference for all purposes.

BACKGROUND OF THE INVENTION

Field of the Invention

The present invention relates to a cup holder for an automobile, which is installed in the interior of a vehicle for holding a beverage cup or a beverage can, and includes a capturing part accommodated in a case through a front cover of a cup holder or advancing forward, and a support plate connected to the capturing part via a first link plate and a second link plate, wherein in a use state that the capturing part advances forward from the case, when a user puts a beverage cup on the support plate in an exposed state or moves the support plate slightly downward, the support plate quickly moves downward and then maintains the moved state, and on the contrary, when the user rotates the support plate and the capturing part on the plane to store the support plate and the capturing part into the case or moves the support plate slightly upward, the support plate quickly moves upward and is folded to be easily stored in the case together with the capturing part.

Background Art

In general, a cup holder for holding a beverage cup or a beverage bottle used by a driver or a passenger is mounted in the interior of a vehicle. Such a cup holder is mounted inside or around a dashboard of the front side in the interior of the vehicle, or mounted on the armrest, the vehicle door, or the rear side of a seat.

The interior components of a vehicle need to be designed to create optimum conditions for efficient and safe driving and operation and to provide passengers with a comfortable and ergonomic riding experience. Accordingly, efforts to avoid unnecessary space occupation and minimize factors that interfere with driving and device operation have been made.

Therefore, the cup holder, of the interior components of a vehicle, needs to occupy minimal space when not in use and provide maximum convenience when in use to maximize driving and operation safety.

Cup holders generally adopted in currently available vehicles commonly adopt a configuration where the cup holder is folded and stored in the vehicle body when not in use not to occupy the interior space of the vehicle and protrudes or is unfolded only when in use. As disclosed in Korean Patent No. 10-916710, a cup holder is stored in a cup holder case to minimize a storage space when not in use, but the cup holder protrudes outward from the cup holder case and a cup support part rotates downward when in use to hold a beverage cup.

However, traditional beverage cups or cans have a volume of around 350 ml, whereas disposable beverage cups for take-away, which are recently used, may exceed 500 ml in volume. Therefore, there is a need for the height of the point where the beverage cup coupled to the coupling structure is captured and supported to be increased. However, traditional cup holders for vehicles cannot secure a sufficient capturing position due to a lower height, which when the beverage cup is separated during use, may cause a traffic accident during driving.

To address the above problems, Korean Patent No. 10-2218171 by the same inventor as the present invention discloses a cup holder which remarkably reduces a storage space of the cup holder and ensures a sufficient holding capacity of the cup holder in an unfolded state. Therefore, the cup holder avoids occupying the interior space of the vehicle by being folded and stored when not in use, and when in use, a rotary plate on the plane rotates and advances forward and a capturing part and a capturing arms ascend to increase a holding capacity of the cup holder, thereby stably supporting large-sized beverage cups and other bulky objects.

However, in case of the cup holder disclosed in Korean Patent No. 10-2218171 by the same inventor as the present invention, the capturing part and the capturing arm are stored in the case via the rotary plate rotating on the plane when not in use, but are moved outward from the case through the rotation of the rotary plate when in use and then ascend to hold a large-capacity beverage cup. However, the capturing part of the conventional cup holder has a complicated structure that a lifting part, a spring, a lifting induction part having a spring and an induction groove, a pin rotation part, an induction pin, and so on must be assembled to the inside of the capturing part, so it increases manufacturing costs.

SUMMARY OF THE INVENTION

Accordingly, the present invention has been made to solve the above-mentioned problems occurring in the prior arts, and it is an object of the present invention to provide a cup holder for a vehicle, in which a capturing part and a capturing arm are stored in a case via a front cover rotating on the plane when not in use but are moved outward from the case when in use to capture a beverage cup, thereby providing the same function as the conventional cup holder, reducing manufacturing costs by having a simplified structure, and minimizing the occupation of the interior space by reducing the volume.

To accomplish the above object, according to the present invention, there is provided a cup holder for a vehicle, in which a capturing part stored in a case is rotated around a rotation shaft and is moved forward, wherein inside the capturing part, a first link fixing hole into which a first link fixing shaft of a first link plate is inserted and connected, a second link fixing hole into which a second link fixing shaft of a second link plate is inserted and connected, and a spring shaft hole into which one end of a spring link is inserted and connected are formed. A vertical plate is formed on one side of the horizontal support plate connected to the capturing part, a first link rotation shaft inserted and connected into a first link rotation hole of the first link plate is formed on the top of the vertical plate, and a second link rotation shaft inserted and connected into a second link rotation hole of the second link plate is formed on the rear surface of the vertical plate. The first and second link plates connecting the vertical plate and the capturing part are configured between the vertical plate of the support plate and the capturing part, a first link fixing shaft inserted and connected into the first link fixing hole of the capturing part is formed on one end of the first link plate, and the first link rotation hole into which the first link rotation shaft of the vertical plate is inserted and connected is formed on the other end thereof, and a second link fixing shaft inserted and connected into the second link fixing hole of the capturing part and a rotation gear engaging with a damper gear are formed on one end of the second link plate, a second link rotation hole into which the second link rotation shaft of the vertical plate is inserted and connected is formed on the other end thereof, and a spring rotation hole into which one end of the spring link is formed on the side thereof. Ends of the spring link with elasticity causing both ends of the spring link to be separated are respectively inserted and connected into the spring shaft hole and the spring rotation hole.

In addition, a rotation damper having a damper gear is provided inside the capturing part so that the second link plate rotates smoothly, and a rotation gear engaging with the damper gear is formed at one end of the second link fixing shaft.

According to the present invention, the cup holder for a vehicle can minimize the occupation of the interior space of the vehicle by storing the capturing part, the capturing arm, and the support plate into the case via the front cover rotating horizontally on the plane when not in use, and reduce manufacturing costs and minimize the occupation of the interior space of the vehicle due to reduction of the volume by having the simplified structure that when in use, the capturing part, the capturing arm, and the support plate advance forward, and the support plate moves quickly downward by manipulating the support plate to move slightly downward and then maintains the moved state.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The detailed configuration and operation process of the present invention will be described through the attached drawings as follows.

Figure 1:
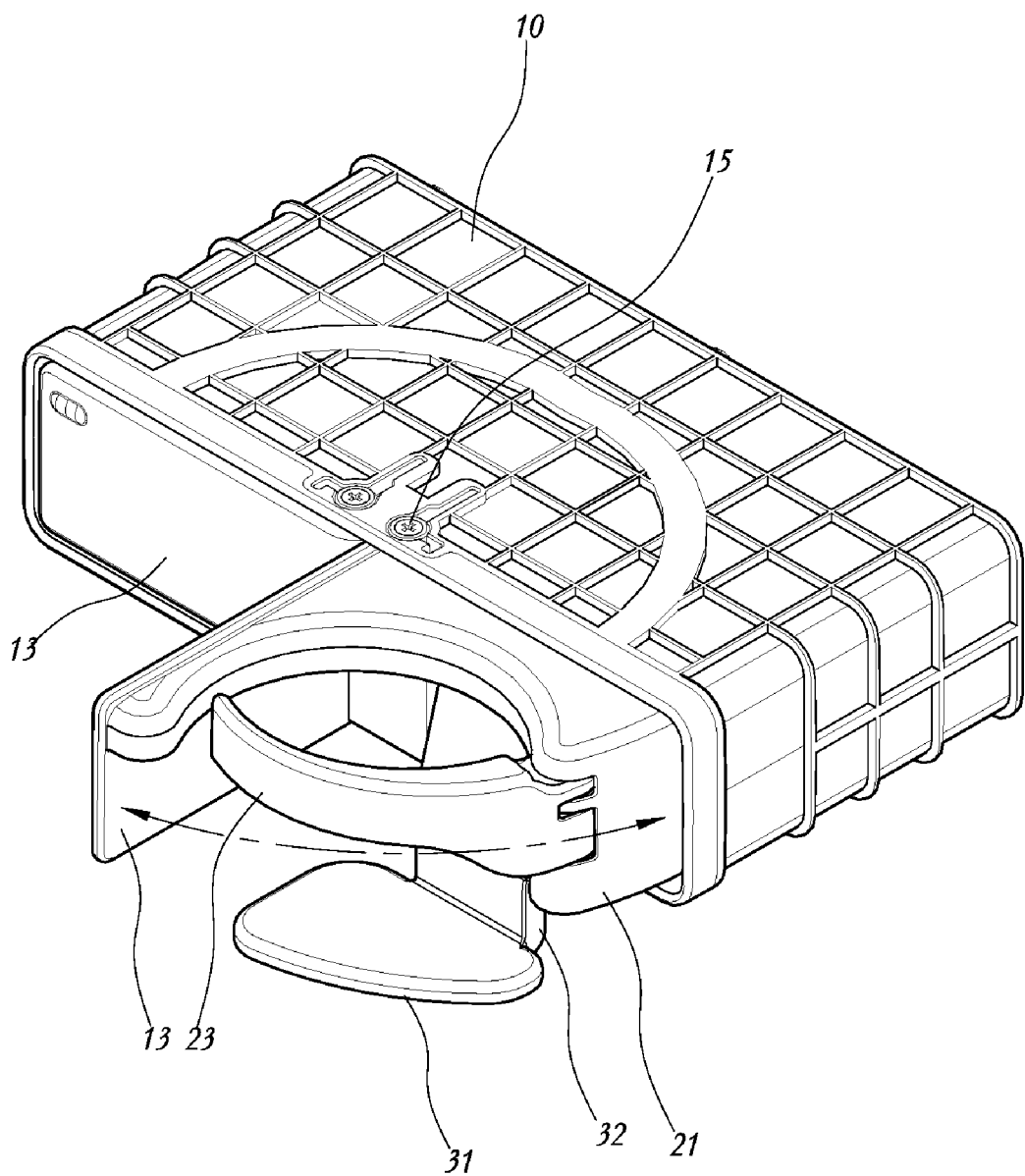
FIG. 1 is a perspective view of the present invention

FIG. 1 illustrates an example of a cup holder for a vehicle according to the present invention. A case 10 includes a front cover 13 that rotates horizontally on the plane around a rotary shaft 15. The front cover 13 includes an arc-shaped capturing part 21 designed to increase the capturing force by getting in contact with the outer circumferential surface of a beverage cup. An arc-shaped capturing arm 23, which is folded while the capturing part 21 is stored inside the case due to the rotation of the front cover 13 or captures the beverage cup when the capturing part 21 advances forward, is formed on one side of the capturing part 21.

Figure 2:
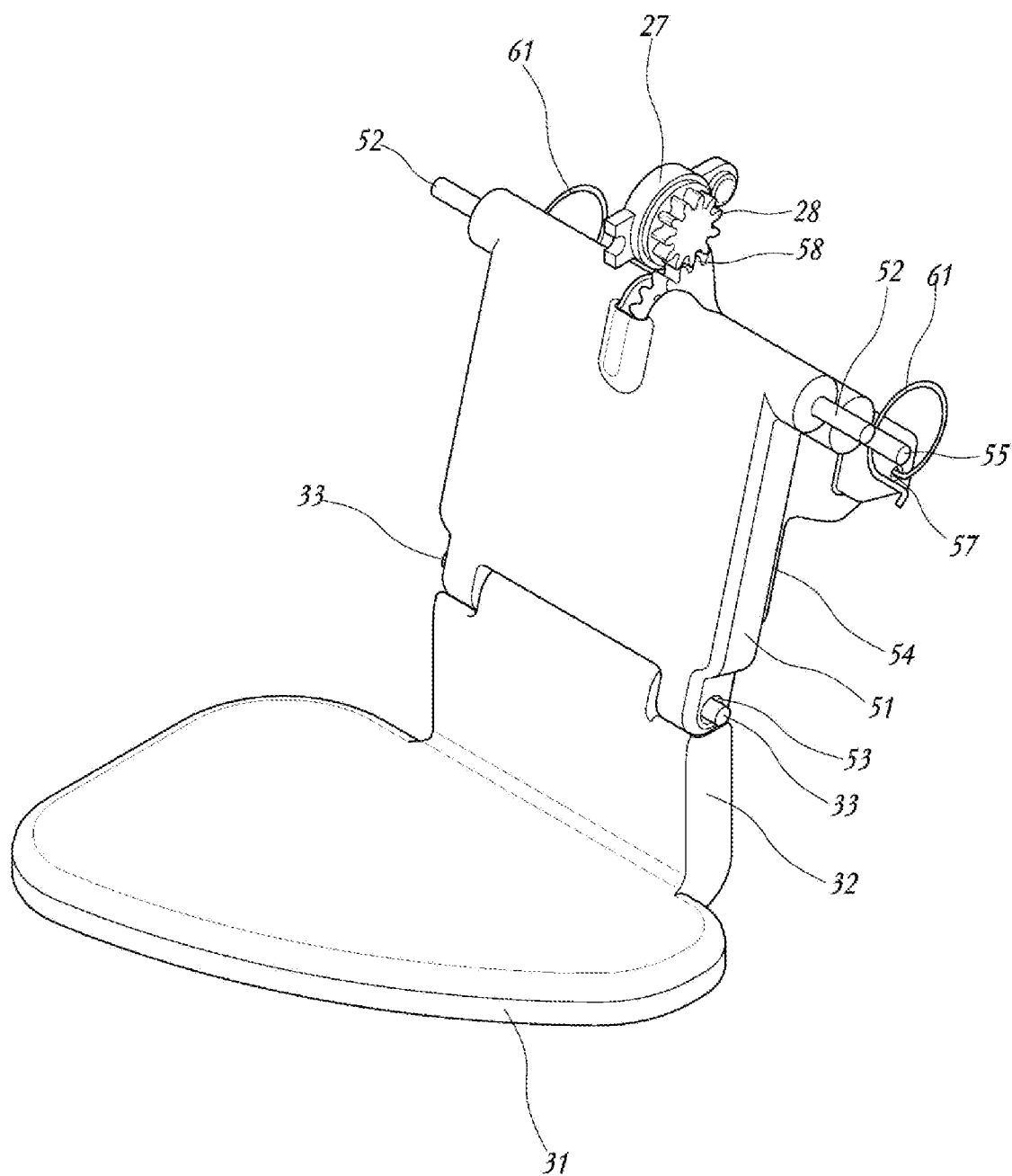
FIG. 2 is a perspective view of essential parts, illustrating a state in which a support plate of the present invention is moved downward.
Figure 5:
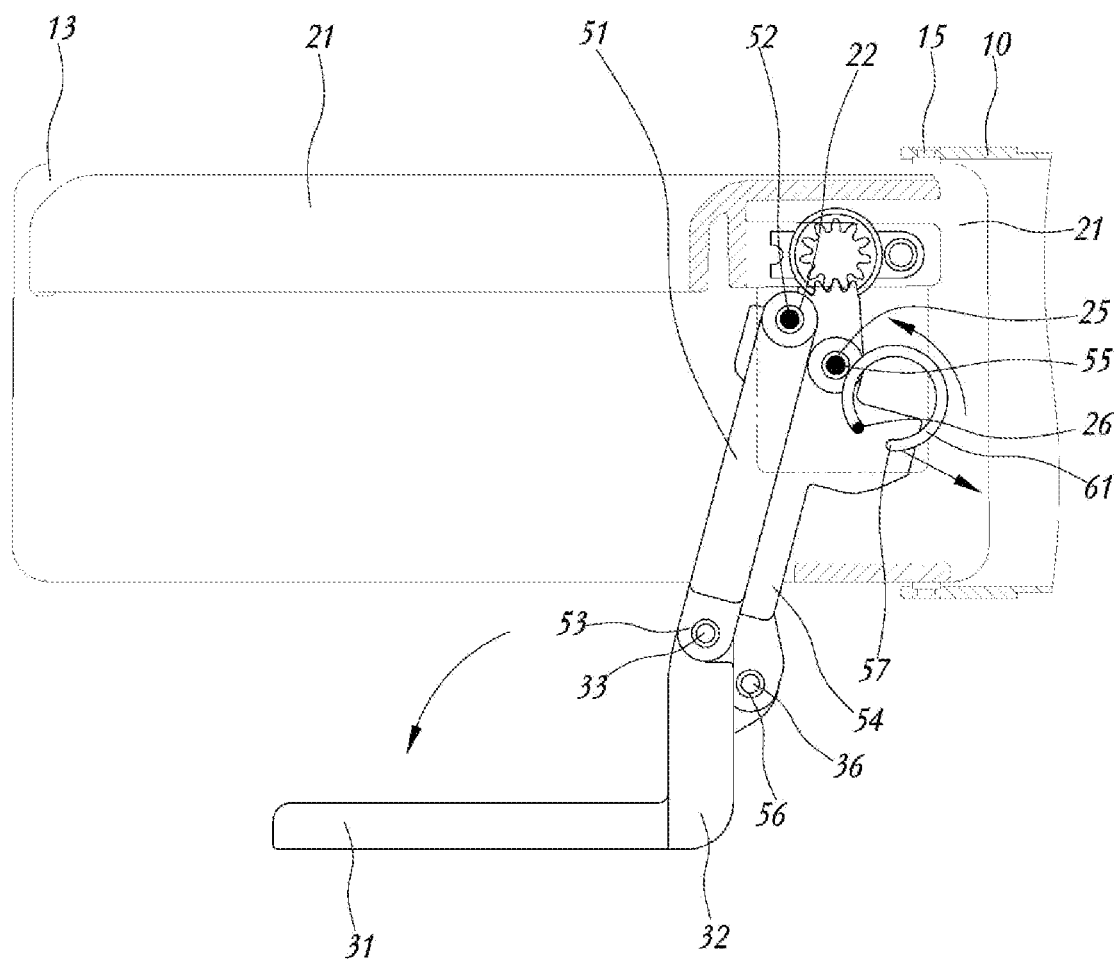
FIG. 5 is a side view of essential parts, illustrating a state in which the support plate of the present invention is moved downward in the case.

As shown in FIGS. 2 and 5, a support plate 31 connected to the capturing part 21 via a first link plate 51 and a second link plate 54 is formed at the lower side of the capturing part 21. The support plate 31 is configured to move into the capturing part 21 while being stored into the case 10 or to move downward below the capturing part 21 to support the bottom of the beverage cup when the capturing part 21 advances. The configuration will be described as follows.

A vertical plate 32 is formed on one side of the horizontal support plate 31 supporting the bottom of the beverage cup, wherein a first link rotation shaft 33 inserted and connected into a first link rotation hole 53 of a first link plate 51 is formed on the top of the vertical plate 32, and a second link rotation shaft 36 inserted and connected into a second link rotation hole 56 of a second link plate 54 is formed on the rear surface of the vertical plate 32.

Although not illustrated in the drawings, inside the capturing part 21, a vertical inner wall and a vertical outer wall are formed. A first link fixing hole 22 into which the first link fixing shaft 52 of the first link plate 51 is inserted and connected and a second link fixing hole 25 into which the second link fixing shaft 55 of the second link plate 54 is inserted and connected are formed on the vertical inner wall of the capturing part 21. A spring shaft hole 26 into which one end of a spring link 61 is inserted and connected is formed on the vertical outer wall adjacent to the vertical inner wall.

Furthermore, a rotation damper 27 having a damper gear 28 is configured on the upper side inside the capturing part 21 to allow smooth rotation of the second link plate 54.

The first and second link plates 51 and 54 connecting the vertical plate 32 and the capturing part 21 are configured between the vertical plate 32 of the support plate 31 and the capturing part 21, wherein the first link fixing shaft 52 inserted and connected into the first link fixing hole 22 of the capturing part 21 is formed on one end of the first link plate 51, and the first link rotation hole 53 into which the first link rotation shaft 33 of the vertical plate 32 is inserted and connected is formed on the other end thereof.

In addition, a second link fixing shaft 55 inserted and connected into the second link fixing hole 25 of the capturing part 21 and a rotation gear 58 engaging with the damper gear 28 are formed on one end of the second link plate 54, a second link rotation hole 56 into which the second link rotation shaft 36 of the vertical plate 32 is inserted and connected is formed on the other end thereof, and a spring rotation hole 57 into which one end of the spring link 61 is formed on the side thereof.

Ends of the first link fixing shaft 52, the second link fixing shaft 55 and the spring link 61 are fit to the vertical inner wall formed inside the capturing part 21 and the vertical outer wall to serve as a fixed shaft of which position is fixed. For clarity, in the drawings, the fixed shaft is illustrated as solid circles filled in black.

Furthermore, both ends of the spring: link 61 are respectively inserted and connected into the spring shaft hole 26 and the spring rotation hole 57, and the spring link 61 is a C-shaped spring with elasticity that both ends tend to be separated from each other.

Therefore, the capturing part 21 of which the first link plate 51 and the second link plate 54 are connected via the first link fixing shaft 52 and the second link fixing shaft 55 is a single fixed link of which the position is fixed. The support plate 31 connected to the first link plate 51 and the second link plate 54 via the first link rotation shaft 33 and the second link rotation shaft 36, the first link plate 51, and the second link plate 54 serve as three movable links of which the position is moved in a predetermined form. with constant shape and movement functions, so the four links serve as four-joint links connected by four joints. The support plate 31 serves to move up and down to a predetermined height while maintaining horizontality in the state in which the capturing part 21 is fixed.

The operation of the present invention will be described as follows.

Figure 3:
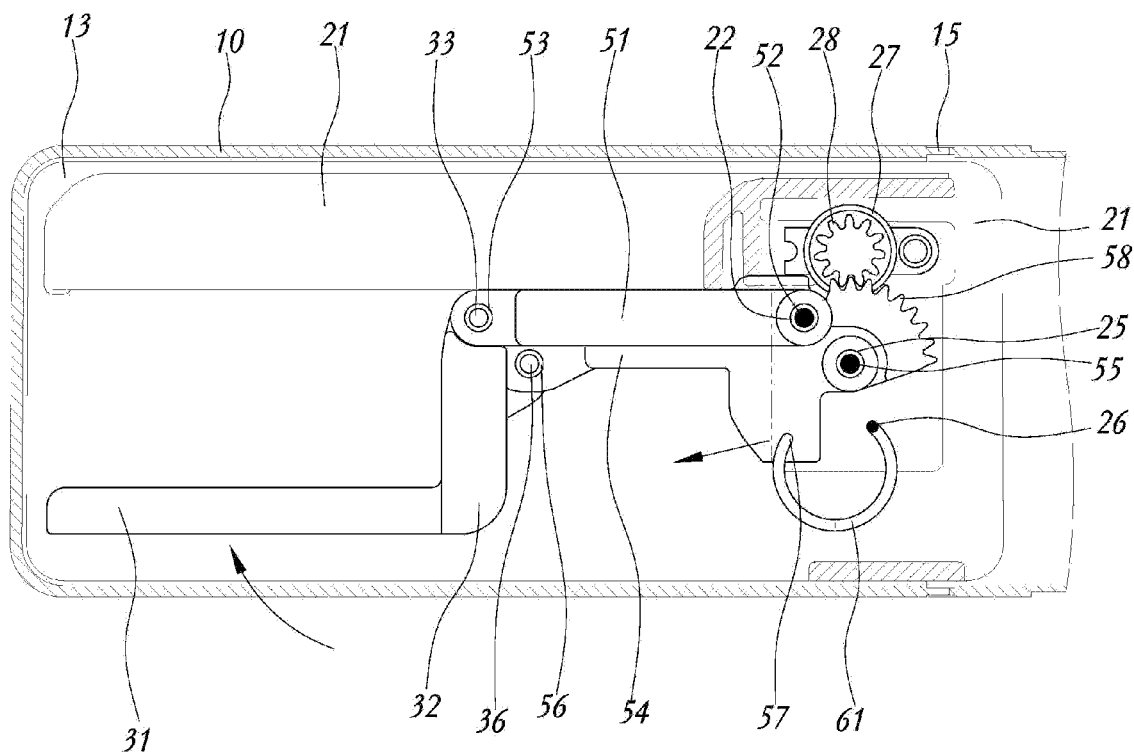
FIG. 3 is a cross-sectional view illustrating a state in which the support plate of the present invention is folded and stored inside a case.

First, FIG. 3 is a side cross-sectional view illustrating the state where the capturing part 21 and the support plate 31 are stored inside the case 10. Due to the elasticity of the spring link 61 of which both ends are separated from each other, the second link plate 54 experiences a force to rotate in the clockwise direction around the second link fixing shaft 55 in the drawing.

Therefore, the second link plate 54 maintains horizontality around the second link fixing shaft 55 due to the elasticity of the spring link 61. Since the support plate 31 connected to the second link plate 54 via the vertical plate 32 and the first link plate 51 connected to the vertical plate 32 also maintain horizontality around the first link fixing shaft 52, the support plate 31 is stored inside the case 10.

Figure 4:
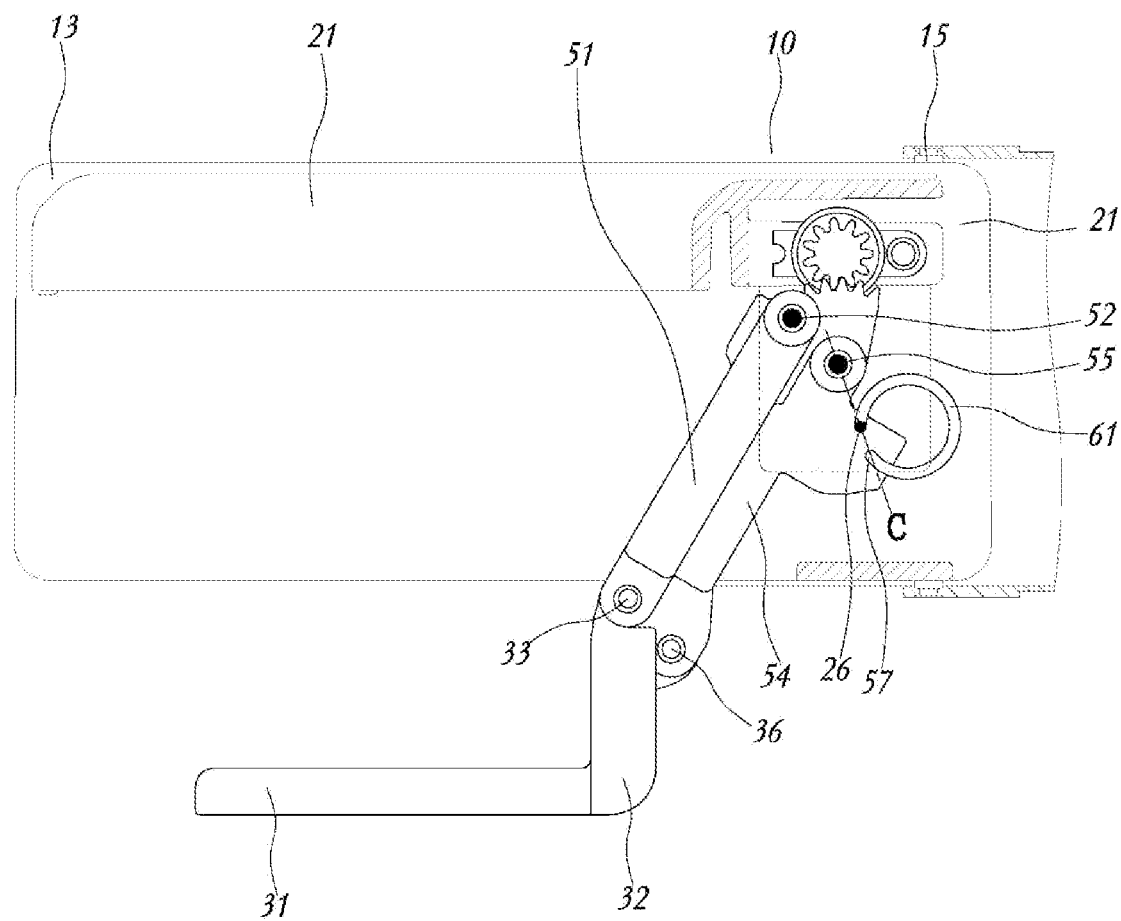
FIG. 4 is a side view illustrating a state in which the support plate of the present invention is lifted.

For use of the cup holder, as illustrated in FIG. 4, when the front cover 13 is rotated via the rotation shaft 15 rotating horizontally on the plane, the capturing part 21 and the support plate 31 connected to the capturing part 21 advance forward. When the user presses the upper side of the support plate 31 with a beverage cup or a finger, the support plate 31 is moved slightly downward.

As the support plate 31 is moved slightly downward, the first link plate 51 and the second link plate 54 connected to the vertical plate 32 overcome the elasticity of the spring link 61 and rotate in the counterclockwise direction around the first link fixing shaft 52 and the second link fixing shaft 55, respectively. Simultaneously, the spring link 61 rotates around the spring shaft hole 26 and both ends approach each other. Thereafter, when passing a central line (C) where the second link fixing shaft 55, the spring shaft hole 26, and the spring rotation hole 57 align in a straight line, as illustrated in FIG. 5, both ends of the spring link 61 are separated from each other by elasticity, and the second link plate 54 experiences a force to rotate in the counterclockwise direction around the second link fixing shaft 55, and the support plate 31 descends autonomously due to the elasticity of the spring link 61 and then is fixed in the position.

In this instance, the second link plate 54 rotates smoothly via the rotation gear 58 engaging with the damper gear 28 of the rotation damper 27 of the capturing part 21, thereby minimizing noise or vibration during the movement of the vertical plate 32.

After the support plate 31 moves downward, the beverage cup can be placed and supported by the capturing part 21, the capturing arm 23, and the support plate 31.

After the use of the cup holder, when the user presses the bottom surface of the support plate 31 with the finger, the support plate 31 moves slightly upward or rotates horizontally on the plane so that the front cover 13 is closed through the rotation shaft 15. Accordingly, when the rear surface of the second link plate 54 gets in contact with the edge of the case 10, the support plate 31 ascends.

As the support plate 31 is moved slightly upward, the first link plate 51 and the second link plate 54 connected to the vertical plate 32 overcome the elasticity of the spring link 61 and rotate in the clockwise direction around the first link fixing shaft 52 and the second link fixing shaft 55, respectively. Simultaneously, the spring link 61 rotates around the spring shaft hole 26 and both ends approach each other. Thereafter, when passing a central line (C) where the second link fixing shaft 55, the spring shaft hole 26, and the spring rotation hole 57 align in a straight line, as illustrated in FIG. 3, both ends of the spring link 61 are separated from each other by elasticity, and the second link plate 54 experiences a force to rotate in the clockwise direction around the second link fixing shaft 55, and the support plate 31 ascends autonomously due to the elasticity of the spring link 61 and then is moved to the capturing part 21. When the front cover 13 is fully closed, the capturing part 21 is stored inside the case 10.

Figure 6:
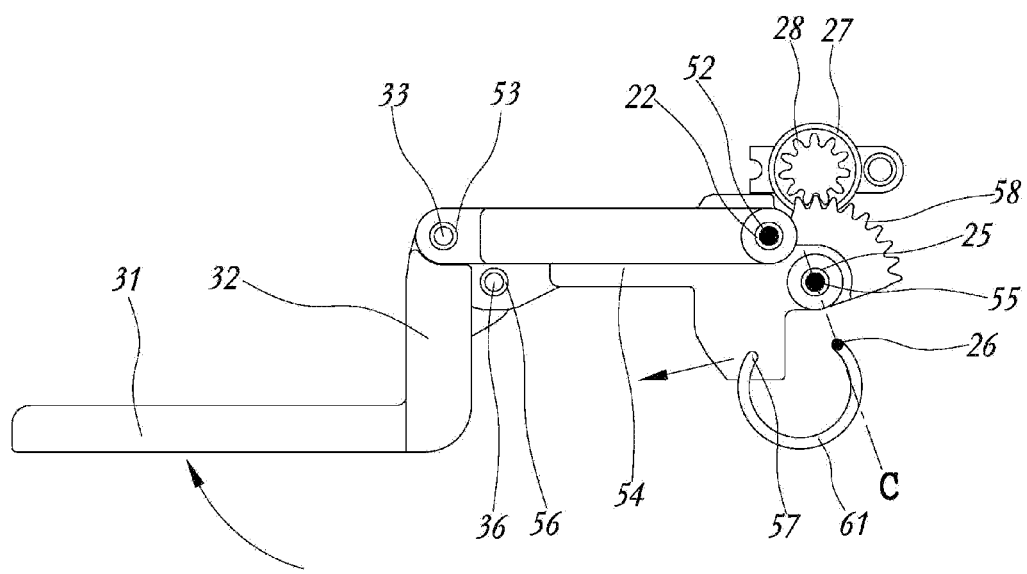
FIG. 6 is a side view of a link plate in the state in which the support plate of the present invention is lifted.
Figure 7:
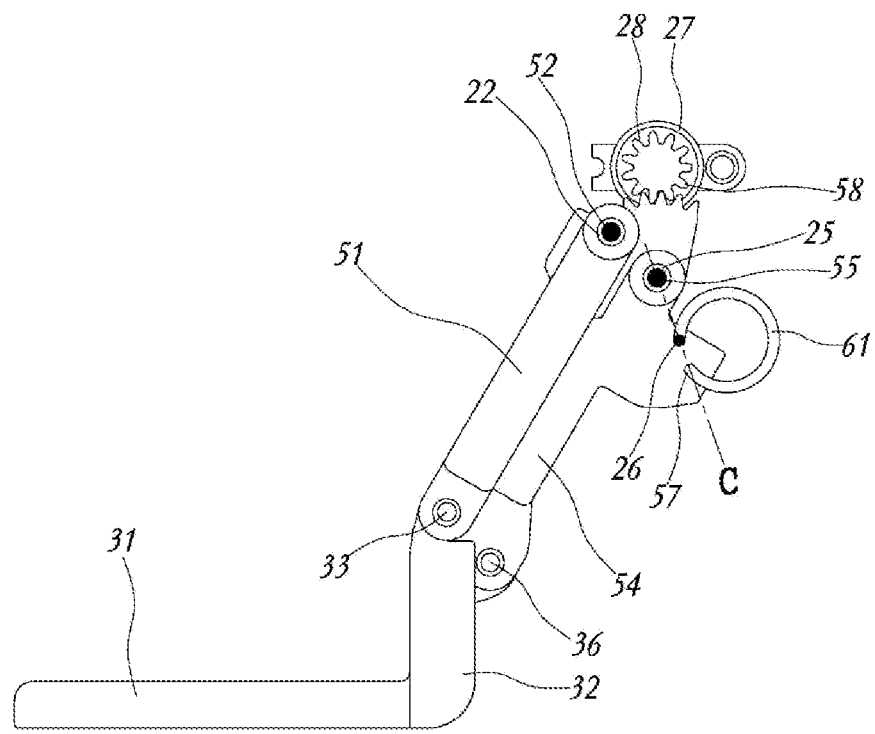
FIG. 7 is a side view of the link plate in the state in which the support plate of the present invention is ascending.

In summary, when in use of the cup holder, as illustrated in FIG. 6, when the user slightly presses the upper surface of the folded support plate 31 downward, as illustrated in FIG. 7, the first link plate 51 and the second link plate 54 are rotated in the counterclockwise direction, and simultaneously, while the spring link 61 is rotated, the ends of the spring link 61 approach each other, and then, passes the central line (C).

Figure 8:
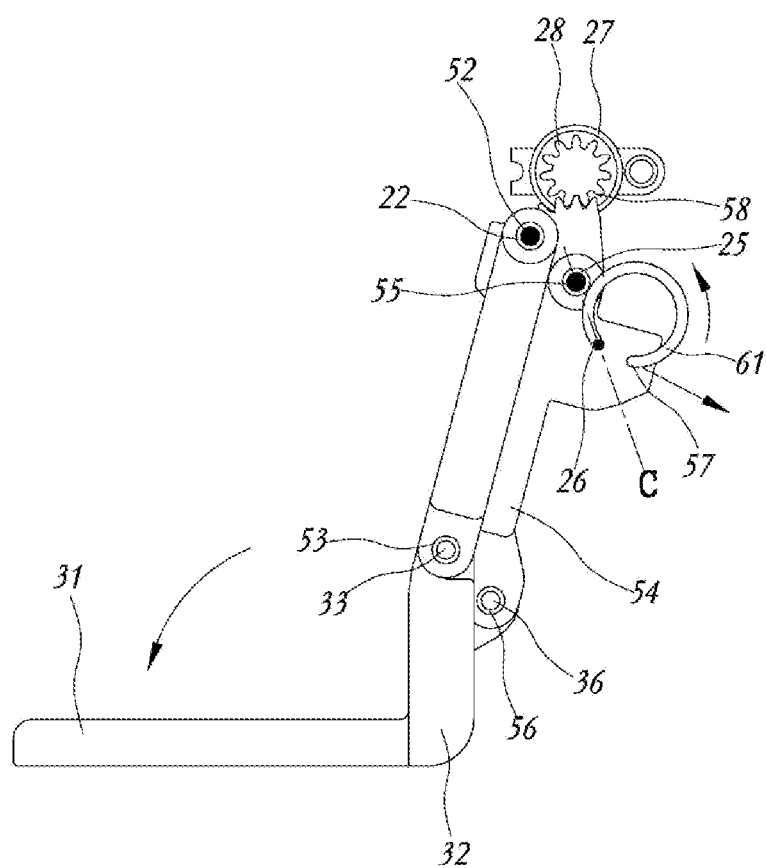
FIG. 8 is a side view of the link plate in the state in which the support plate of the present invention is lowered.

Thereafter, as illustrated in FIG. 8, due to the elasticity causing the ends of the spring link 61 to be separated, the support plate 31 descends autonomously and maintains the lowered state, so that the beverage cup can be held on the support plate 31.

On the contrary, when not in use of the cup holder, as illustrated in FIG. 8, when the user slightly presses the upper surface of the unfolded support plate 31 upward, as illustrated in FIG. 7, the first link plate 51 and the second link plate 54 are rotated in the clockwise direction, and simultaneously, while the spring link 61 is rotated, the ends of the spring link 61 approach each other, and then, passes the central line (C).

Thereafter, as illustrated in FIG. 6, due to the elasticity causing the ends of the spring link 61 to be separated, the support plate 31 ascends autonomously and maintains the folded state, so that the cup holder can be stored inside the case 31.

What is claimed is:

1. A cup holder for a vehicle in which a capturing part stored in a case is rotated around a rotation shaft and is moved forward,
    wherein inside the capturing part, a first link fixing hole into which a first link fixing shaft of a first link plate is inserted and connected, a second link fixing hole into which a second link fixing shaft of a second link plate is inserted and connected, and a spring shaft hole into which one end of a spring link is inserted and connected are formed,
    wherein a vertical plate is formed on one side of a horizontal support plate connected to the capturing part, a first link rotation shaft inserted and connected into a first link rotation hole of the first link plate is formed on the top of the vertical plate, and a second link rotation shaft inserted and connected into a second link rotation hole of the second link plate is formed on the rear surface of the vertical plate,
    wherein the first and second link plates connecting the vertical plate and the capturing part are configured between the vertical plate of the support plate and the capturing part, a first link fixing shaft inserted and connected into the first link fixing hole of the capturing part is formed on one end of the first link plate, and the first link rotation hole into which the first link rotation shaft of the vertical plate is inserted and connected is formed on the other end thereof, and a second link fixing shaft inserted and connected into the second link fixing hole of the capturing part and a rotation gear engaging with a damper gear are formed on one end of the second link plate, a second link rotation hole into which the second link rotation shaft of the vertical plate is inserted and connected is formed on the other end thereof, and a spring rotation hole into which one end of the spring link is formed on the side thereof, and wherein ends of the spring link with elasticity causing both ends of the spring link to be separated are respectively inserted and connected into the spring shaft hole and the spring rotation hole.

2. The cup holder for a vehicle according to claim 1, wherein a rotation damper having a damper gear is provided inside the capturing part so that the second link plate rotates smoothly, and a rotation gear engaging with the damper gear is formed at one end of the second link fixing shaft.

\* \* \* \* \*